United States Patent
Ruengeler et al.

(10) Patent No.: US 12,517,173 B2
(45) Date of Patent: Jan. 6, 2026

(54) TEST AND/OR MEASUREMENT SYSTEM

(71) Applicant: Rohde & Schwarz GmbH & Co. KG, Munich (DE)

(72) Inventors: Matthias Ruengeler, Munich (DE); Florian Ramian, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 147 days.

(21) Appl. No.: 18/596,435

(22) Filed: Mar. 5, 2024

(65) Prior Publication Data
US 2025/0283939 A1     Sep. 11, 2025

(51) Int. Cl.
*G01R 31/327*  (2006.01)
*G01R 31/317*  (2006.01)

(52) U.S. Cl.
CPC ............... *G01R 31/31727* (2013.01)

(58) Field of Classification Search
CPC ......... G01R 23/00; G01R 31/317; G01R 31/31725; G01R 31/31726; G01R 31/31727; G01R 31/318552; G01R 31/318594; G01R 31/318328
See application file for complete search history.

(56) References Cited

U.S. PATENT DOCUMENTS

| 9,847,843 | B2* | 12/2017 | Rivoir | G01R 31/3025 |
| 2011/0248733 | A1* | 10/2011 | Kantake | G01R 31/31726 324/750.01 |
| 2018/0143296 | A1* | 5/2018 | Lee | H03F 3/19 |
| 2019/0170823 | A1* | 6/2019 | Kenichi | G01R 31/31709 |

FOREIGN PATENT DOCUMENTS

WO    WO-2023186293 A1 * 10/2023    ........... H03K 3/017

* cited by examiner

*Primary Examiner* — Son T Le
(74) *Attorney, Agent, or Firm* — CHRISTENSEN O'CONNOR JOHNSON KINDNESS PLLC

(57) ABSTRACT

A system includes a clock generator circuit configured to generate a clock signal and a capture start circuit configured to generate a capture start signal based on the clock signal. A measurement circuit is configured to receive the capture start signal from the capture start circuit and to digitize an RF signal based on the capture start signal, thereby obtaining a digitized RF signal. The system further includes a signal analysis circuit that is configured to determine at least one signal parameter of the digitized RF signal. The system further includes a signal prediction circuit that is configured to generate at least one predicted signal parameter based on a first starting point and based on a second starting point. The system further includes a signal comparison circuit configured to compare the at least one signal parameter of the digitized RF signal with the at least one predicted signal parameter.

20 Claims, 3 Drawing Sheets

TEST AND/OR MEASUREMENT SYSTEM

FIELD OF THE DISCLOSURE

Embodiments of the present disclosure generally relate to a test and/or measurement system.

BACKGROUND

When performing measurements with certain types of measurement instruments or when performing a calibration of certain types of measurement instruments, successive captures at different center frequencies or even at the same center frequency have an unknown time difference, i.e. a group delay between successive measurements is unknown.

Accordingly, it is difficult to relate different captures of the same measurement parameter, for example of a frequency response, at different center frequencies or even at the same center frequency.

Thus, there is a need for a test and/or measurement system that allows to relate successive measurements with each other.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a test and/or measurement system. In an embodiment, the test and/or measurement system comprises a clock generator circuit connectable to a reference signal generator circuit and configured to generate a clock signal. The test and/or measurement system also comprises a capture start circuit configured to generate a capture start signal based on the clock signal. The test and/or measurement system further comprises a measurement circuit being connectable to the reference signal generator circuit and configured to receive the capture start signal from the capture start circuit. The measurement circuit is configured to receive a radio frequency (RF) signal, wherein the RF signal is based on a reference signal generated by the reference signal generator circuit, and wherein the measurement circuit is configured to digitize the RF signal based on the capture start signal, thereby obtaining a digitized RF signal.

In an embodiment, the test and/or measurement system comprises a signal analysis circuit configured to determine at least one signal parameter of the digitized RF signal, and a signal prediction circuit configured to determine and/or receive a first starting point and a second starting point.

In an embodiment, the first starting point corresponds to a time at which the reference signal generator circuit begins to generate the reference signal, and the second starting point corresponds to a time at which the capture start circuit begins to generate the capture start signal. The signal prediction circuit is configured to generate at least one predicted signal parameter based on the first starting point and based on the second starting point.

The test and/or measurement system further comprises a signal comparison circuit, wherein the signal comparison circuit is configured to compare the at least one signal parameter of the digitized RF signal with the at least one predicted signal parameter.

Therein and in the following, the term "the measurement circuit is configured to digitize the RF signal based on the capture start signal" is understood to denote that the measurement circuit starts to digitize the RF signal immediately upon reception of the capture start signal or with a predetermined delay, for example wherein the predetermined delay may be adjustable.

The test and/or measurement system according to the present disclosure is based on the idea to tie the reference signal generated by the reference signal generator circuit to the clock signal generated by the clock signal generator circuit, i.e. to tie the first starting point to the clock signal, and to additionally generate the capture start signal based on the clock signal, such that the second starting point is known. As the first starting point and the second starting point are known, it is possible to predict properties of the reference signal and thus of the RF signal for each capture performed by the measurement circuit This also allows for determining a relation between successive captures performed by the measurement circuit, for example a group delay between the different captures.

If the test and/or measurement system or a test and/or measurement instrument of the measurement system is to be calibrated based on the reference signal, the received RF signal is the generated reference signal. As the first starting point and the second starting point are known, the properties of the received RF signal and thus an idealized version of the at least one signal parameter can be predicted. In other words, the at least one predicted signal parameter is an idealized version of the at least one signal parameter.

Based on a difference between the at least one signal parameter (corresponding to the actual measurement performed on the received RF signal) and the at least one predicted signal parameter, the test and/or measurement system or the test and/or measurement instrument can be calibrated.

In an embodiment, the calibration can be performed for a plurality of different center RF frequencies of the reference signal.

If measurements are to be performed on a device under test, i.e. if a device under test is interconnected between the reference signal generator circuit and the measurement circuit, the received RF signal corresponds to the reference signal processed by the device under test.

In this case, the at least one predicted signal parameter may be the at least one signal parameter determined for the reference signal. In other words, the at least one predicted signal parameter may serve as a reference for performing measurements on the RF signal received from the device under test.

Based on the at least one predicted signal parameter and based on the at least one signal parameter, i.e. by comparing the reference with the actual measurement, a performance of the device under test can be assessed.

In an embodiment, using a calibration result from the calibration described above, an RF frequency response, an intermediate frequency (IF) frequency response, an RF phase response, and/or an IF phase response can be compensated. Moreover, a group delay resulting from switching to a different center RF frequency can be compensated. This allows to perform a spectral stitching in frequency and/or phase of the measurement results obtained.

In an embodiment of the present disclosure, the reference signal generated by the reference signal generator circuit is a periodic signal. In other words, the reference signal may be a repetitive signal having a certain period.

In an embodiment of the present disclosure, the clock generator circuit comprises a clock derivation circuit, wherein the clock derivation circuit is configured to process the clock signal, thereby obtaining a derived clock signal. The derived clock signal may have a frequency that is smaller or greater than a frequency of the clock signal.

According to an aspect of the present disclosure, the at least one signal parameter comprises, for example, at least one of a phase, a group delay, or an amplitude. However, it is to be understood that the at least one signal parameter may be or comprise any other suitable parameter describing the RF signal.

In an embodiment of the present disclosure, the clock generator circuit comprises a clock counter circuit, wherein the clock counter circuit is configured to count clock cycles of the clock signal, thereby obtaining a clock count, and wherein the first starting point and/or the second starting point are/is linked to a respective value of the clock count. The clock count provides a reference for linking the first starting point and the second starting point to each other. Further, the clock count provides a reference for linking successive captures performed by the measurement circuit with each other.

Another aspect of the present disclosure provides that the signal prediction circuit, for example, is configured to link the first starting point to the respective value of the clock count. In an embodiment, the signal prediction circuit may receive the clock count from the clock counter circuit, and may link the first starting point to the clock count based on the received clock count. In other words, the signal prediction circuit may determine the first starting point in terms of the clock count.

In a further embodiment of the present disclosure, the signal prediction circuit or the capture start circuit is configured to link the second starting point to the respective value of the clock count. In other words, the signal prediction circuit may determine the second starting point in terms of the clock count.

For example, the signal prediction circuit may receive the clock count from the clock counter circuit. The signal prediction circuit may further receive a signal from the capture start circuit indicating that a capture is started, for example the capture start signal. The signal prediction circuit may link the second starting point to the respective value of the clock count based on the received clock count and based on the signal received from the capture start circuit.

In another example, the capture start circuit may receive the clock count from the clock counter circuit. The capture start circuit may link the second starting point to the clock count based on the received clock count and based on the capture start signal generated. In other words, the capture start circuit may determine the second starting point in terms of the clock count.

In an embodiment, the capture start circuit may forward the second starting point to the signal prediction circuit.

In an embodiment, the signal prediction circuit may be configured to continuously receive the clock count. As the reference signal generated by the reference signal generator circuit is tied to the clock signal and thus to the clock count, this allows the signal prediction circuit to accurately predict the at least one signal parameter, i.e. to accurately generate the at least one predicted signal parameter.

An aspect of the present disclosure provides that the test and/or measurement system, for example, further comprises a start circuit, wherein the start circuit is configured to control the reference signal generator circuit to start generating the reference signal.

In an embodiment, the start circuit may receive the clock signal and/or the clock count from the clock generator circuit. The start circuit may be configured to control the reference signal generator circuit to start generating the reference signal based on the clock signal and/or based on the clock count.

In an embodiment, the start circuit may be configured to determine the first starting point based on the clock signal. In an embodiment, the start circuit may be configured to determine the first starting point based on the clock count. As the start circuit controls the reference signal generator circuit to start generating the reference signal, the start circuit can link the first starting point to the clock signal or to the clock count.

In an embodiment, the start circuit may forward the first starting point to the signal prediction circuit.

According to an aspect of the present disclosure, the test and/or measurement system, for example, may further comprise a start circuit, wherein the start circuit is configured to control the clock generator circuit to reset the clock signal and/or a derived clock signal that is derived from the clock signal generated.

In an embodiment, the start circuit may be configured to control the clock counter circuit to reset the clock count.

In an embodiment of the present disclosure, the signal prediction circuit is configured to determine the first starting point based on the clock signal. The reference signal generator circuit may start generating the reference signal upon reset of the clock signal and/or of the clock count. Accordingly, the signal prediction circuit can link the first starting point to the clock signal, for example the clock count, as the reset of the clock signal may correspond to the first starting point.

Alternatively or additionally, the signal prediction circuit may receive a signal indicating that the clock signal is reset from the start circuit. The signal prediction circuit may link the first starting point to the clock signal, for example to the clock count, based on the signal received from the start circuit.

In another embodiment of the present disclosure, the reference signal generator circuit is configured to generate the first starting point, and wherein the signal prediction circuit is configured to receive the first starting point from the reference signal generator circuit. Thus, the first starting point may be provided directly by the signal generator circuit.

In an embodiment, the test and/or measurement system may further comprise the reference signal generator circuit, wherein the reference signal generator circuit is configured to generate the reference signal based on the clock signal or based on a derived clock signal that is derived from the clock signal generated.

In an embodiment, the signal generator circuit may be a wideband reference generator.

For example, the reference signal generator circuit is established as a comb generator. Thus, the reference signal generated by the reference signal generator may be a frequency comb signal having a plurality of pickets or teeth in frequency domain, i.e. a plurality of peaks that each have a Dirac-delta-function-shaped form.

In an embodiment, the test and/or measurement system or the test and/or measurement instrument of the measurement system can be calibrated based on the reference signal being a frequency comb as described above. Therein, one tooth of the frequency comb signal or several teeth of the frequency comb signal may be captured, i.e. digitized by the measurement circuit, at a time.

According to an aspect of the present disclosure, the test and/or measurement system, for example, further comprises a continuous wave (CW) generator circuit, wherein the CW generator circuit is interconnected between the clock generator circuit and the reference signal generator circuit. The CW generator circuit is configured to generate a CW signal based on the clock signal or based on a derived clock signal that is derived from the clock signal generated. The CW signal is forwarded to the reference signal generator circuit. The reference signal generator circuit may then generate the reference signal based on the CW signal received from the CW generator circuit.

In an embodiment of the present disclosure, the test and/or measurement system further comprises a device under test, wherein the device under test is interconnected between the reference signal generator circuit and the measurement circuit. As already described above, measurements may be performed on the device under test, for example in order to assess a performance of the device under test.

In another embodiment of the present disclosure, the test and/or measurement system further comprises a test and/or measurement instrument, wherein the clock generator circuit, the capture start circuit, the measurement circuit, the signal analysis circuit, the signal prediction circuit, and the signal comparison circuit are integrated into the test and/or measurement instrument. Accordingly, the captures of the RF signal by the measurement circuit as well as the generation of the reference signal by the reference signal generator circuit are tied to the clock signal being an internal clock of the test and/or measurement instrument.

For example, the test and/or measurement instrument may be a vector network analyzer or a spectrum analyzer. However, it is to be understood that the test and/or measurement instrument may be established as any other suitable type of test and/or measurement instrument.

A further aspect of the present disclosure provides that the test and/or measurement system, for example, further comprises a test and/or measurement instrument, wherein the capture start circuit, the measurement circuit, the signal analysis circuit, the signal prediction circuit, and the signal comparison circuit are integrated into the test and/or measurement instrument, and wherein the clock generator circuit is established separately from the test and/or measurement instrument. Accordingly, the captures of the RF signal by the measurement circuit as well as the generation of the reference signal by the reference signal generator circuit are tied to the clock signal being an external clock with respect to the test and/or measurement instrument.

In an embodiment, the capture start circuit may be configured to continuously generate and output the capture signal. Accordingly, the RF signal may be captured repeatedly, i.e. the RF signal may be digitized by the measurement circuit repeatedly. In other words, the capture start signal may be an heartbeat trigger signal that periodically triggers the measurement circuit to capture the RF signal, i.e. to digitize the RF signal. Therein and in the following, the term "continuously" is understood to denote that the respective action is performed repeatedly over a predetermined time span, for example with a certain repetition rate.

In an example, the repetition rate may be between 0.5 kHz and 2 kHz. However, it is to be understood that the repetition rate may be greater or smaller, for example by several orders of magnitude.

In a further embodiment of the present disclosure, the signal comparison circuit is configured to continuously compare the at least one predicted signal parameter with the at least one signal parameter. In other words, the signal comparison circuit may be configured to compare the at least one predicted signal parameter with the at least one signal parameter repeatedly.

According to another aspect of the present disclosure, the test and/or measurement system, for example, further comprises a control circuit, wherein the control circuit is configured to set operational parameters of the test and/or measurement system based on the comparison of the at least one signal parameter with the at least one predicted signal parameter. In other words, the test and/or measurement instrument may be calibrated based on the comparison of the at least one signal parameter with the at least one predicted signal parameter, as already described above.

In an embodiment, the test and/or measurement instrument may be calibrated based on a deviation of the at least one signal parameter from the at least one predicted signal parameter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
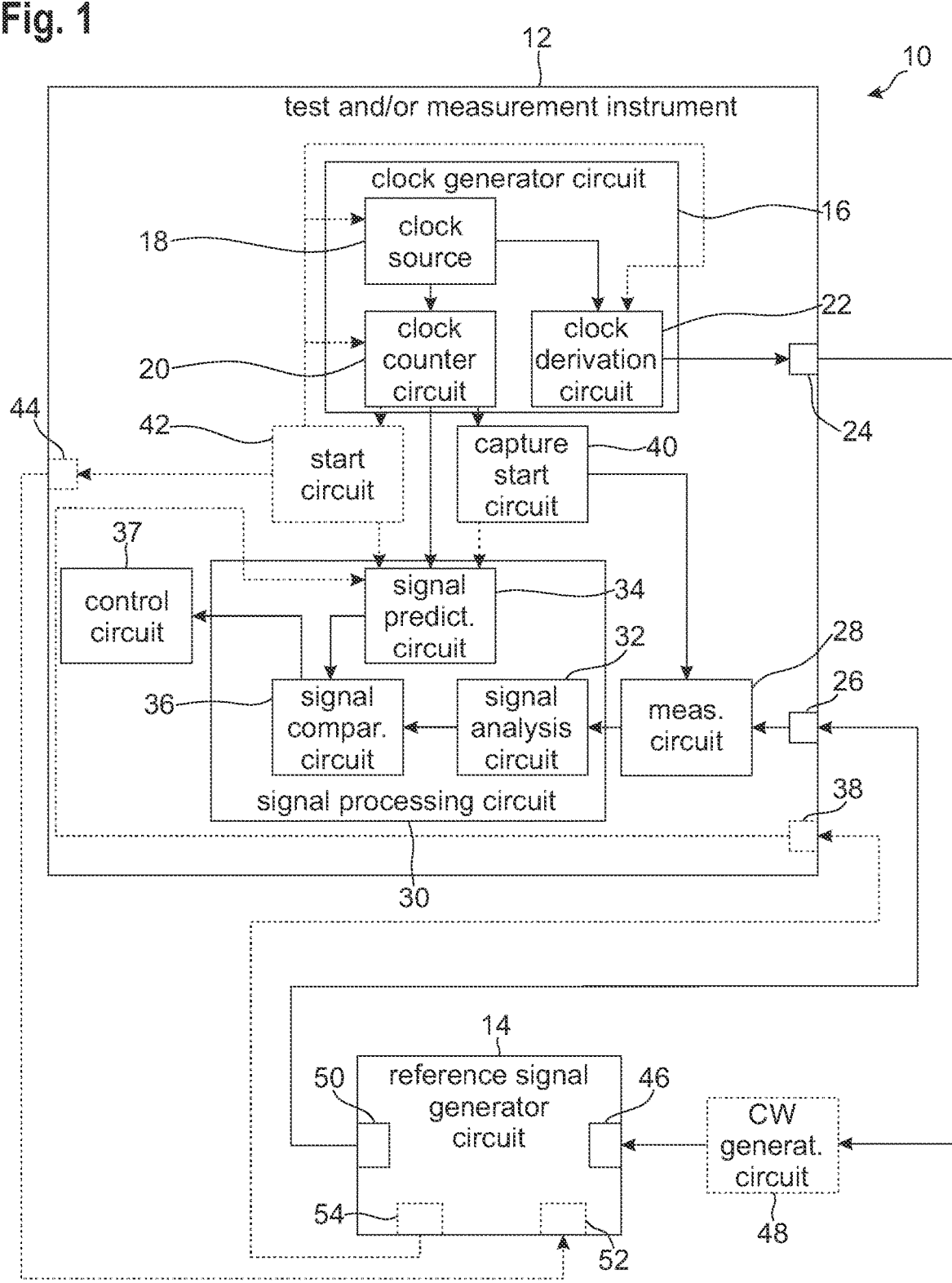
FIG. 1 schematically shows a test and/or measurement system according to an embodiment of the present disclosure.
Figure 2:
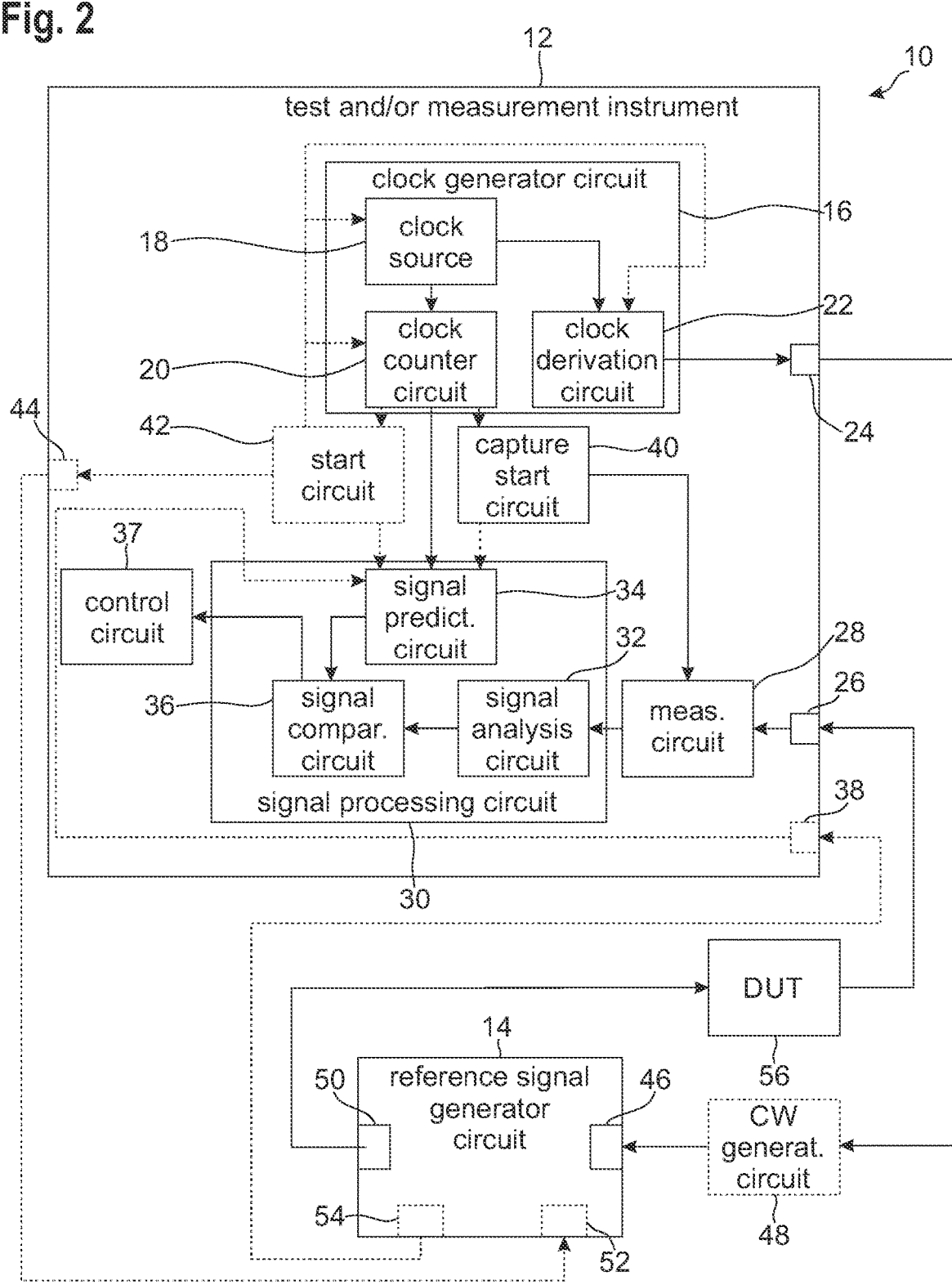
FIG. 2 schematically shows a test and/or measurement system according to another embodiment of the present disclosure.

It is noted that optional components and features are illustrated with dashed lines and arrows in FIGS. 1 and 2. However, this does not imply that components and features illustrated by solid lines and arrows in FIGS. 1 and 2 are necessarily essential.

FIG. 1 schematically shows a representative test and/or measurement system 10 comprising a test and/or measurement instrument 12 and a reference signal generator circuit 14. In general, the test and/or measurement instrument 12 is configured to perform tests and/or measurements on electronic devices under test. For example, the test and/or measurement instrument 12 may be a vector network analyzer or a spectrum analyzer. However, it is to be understood that the test and/or measurement instrument 12 may be established as any other suitable type of test and/or measurement instrument.

In the embodiment of FIG. 1, the reference signal generator circuit 14 is configured to generate a reference signal, for example a wideband reference signal, that can be used in order to calibrate the test and/or measurement instrument 12, and/or in order to perform measurements on a device under test, as will be described in more detail below. For example, the reference signal generator circuit 14 may be a standalone wideband reference signal generator. It is noted that while the reference signal generator circuit 14 is shown to be established separately from the test and/or measurement instrument 12 in FIG. 1, it is also conceivable that the reference signal generator circuit 14 may be integrated into the test and/or measurement instrument 12.

As shown in FIG. 1, the test and/or measurement instrument 12 comprises a clock generator circuit 16. The clock generator circuit 16 comprises a clock source 18 that is configured to generate a clock signal having a predefined frequency. For example, the predefined frequency may be between 100 MHz and 1 GHz. However, it is to be understood that lower or higher frequencies are also possible.

In an embodiment, the clock generator circuit 16 further comprises a clock counter circuit 20 and a clock derivation circuit 22 that are each connected to the clock source 18 so as to receive the clock signal. The clock counter circuit 20 is configured to generate a clock count based on the clock signal, for example by counting the number of clock cycles of the clock signal. The clock derivation circuit 22 is configured to generate a derived clock signal based on the clock signal received from the clock source 18.

Therein, the frequency of the derived clock signal may be smaller than or greater than the frequency of the original clock signal. In a specific example, the frequency of the clock signal may be 125 MHz, and the frequency of the derived clock signal may be 1 GHz.

In an embodiment, the test and/or measurement instrument 12 comprises a clock output 24 that is connected to the clock derivation circuit 22. The clock output 24 is configured to forward the derived clock signal to external electronic devices connected to the clock output 24.

The test and/or measurement instrument 12 further comprises a measurement input 26 that is configured to receive an RF signal from an external electronic device and a measurement circuit 28 that is provided downstream of the measurement input 26, such that the RF signal is forwarded to the measurement circuit 28. The measurement circuit 28 is configured to digitize the received RF signal, thereby obtaining a digitized RF signal.

Still referring to the embodiment of FIG. 1, the test and/or measurement instrument 12 further comprises a signal processing circuit 30 that is connected to both the measurement circuit 28 and the clock counter circuit 20. In an embodiment, the signal processing circuit 30 comprises a signal analysis circuit 32 that is connected to the measurement circuit 28 downstream of the measurement circuit 28, such that the signal analysis circuit 32 receives the digitized RF signal.

In an embodiment, the signal analysis circuit 32 is configured to determine at least one signal parameter of the digitized RF signal. For example, the at least one signal parameter comprises a phase, a group delay, and/or an amplitude. However, it is to be understood that the at least one signal parameter may be or comprise any other suitable parameter describing the RF signal.

In an embodiment, the signal processing circuit 30 further comprises a signal prediction circuit 34 that is provided downstream of the clock counter circuit 20 so as to receive the clock count. The signal processing circuit 30 further comprises a signal comparison circuit 36 that is connected to each of the signal analysis circuit 32 and the signal prediction circuit 34. The functionality of the signal processing circuit 30 will be described in more detail below.

In an embodiment, the test and/or measurement instrument 12 further comprises a control circuit 37 that is connected to the signal comparison circuit 36. In general, the control circuit 37 is configured to set operational parameters of the test and/or measurement instrument 12.

Optionally, the test and/or measurement instrument 12 comprises a sequence start input 38 that is connected to the signal prediction circuit 34.

In an embodiment, the test and/or measurement instrument 12 further comprises a capture start circuit 40. The capture start circuit 40 is connected to the clock counter circuit 20 so as to receive the clock count. The capture start circuit 40 further is connected to the measurement circuit 28 and, optionally, to the signal prediction circuit 34. In general, the capture start circuit 40 is configured to generate a capture start signal that is provided to the measurement circuit 28.

Upon reception of the capture start signal from the capture start circuit 40, the measurement circuit 28 captures the received RF signal, i.e. digitizes the received RF signal. In an embodiment, the capture start circuit 40 may generate and output the capture start signal continuously. Accordingly, the capture start signal may be an heartbeat trigger signal that periodically triggers the measurement circuit 28 to capture the RF signal, i.e. to digitize the RF signal.

Optionally, the test and/or measurement instrument 12 may further comprise a start circuit 42 that may be interconnected between the clock counter circuit 20 and the signal prediction circuit 34. Optionally, the test and/or measurement instrument 12 may further comprise a sequence start output 44 that is connected to the start circuit 42, and that is connectable to external electronic devices. The functionality of the start circuit 42 and of the sequence start output 44 will be described in more detail below.

In an embodiment, the reference signal generator circuit 14 comprises a clock input 46 that is connected to the clock output 24 of the test and/or measurement instrument 12 directly or indirectly. If the clock input 46 is connected to the clock output 24 directly, the clock input 46 is configured to receive the derived clock signal from the clock derivation circuit 22.

If the clock input 46 is connected to the clock output 24 indirectly, a continuous wave (CW) generator circuit 48 may be provided between the clock output 24 and the clock input 46. In this case, the CW generator circuit 48 may be configured to generate a CW signal based on the derived clock signal, and the clock input 46 may receive the CW signal generated by the CW generator circuit 48.

The reference signal generator circuit 14 is configured to generate a reference signal based on the derived clock signal or based on the CW signal. In general, the generated reference signal is a periodic signal having a predefined period. In other words, the generated reference signal is repetitive with the predefined period. In an embodiment, the generated reference signal may have an adaptable frequency. In other words, the reference signal generator circuit 14 may be configured to adapt the frequency of the reference signal generated. In an embodiment, the generated reference signal may be a frequency comb signal.

In an embodiment, the signal generator circuit 14 further comprises a reference signal output 50 that is connected with the measurement input 26 directly or indirectly. In the example embodiment shown in FIG. 1, the reference signal output 50 is connected with the measurement input 26 directly, i.e. no further electronic components may be provided between the reference signal generator circuit 14 and the measurement input 26.

Optionally, the reference signal generator circuit 14 may further comprise a start input 52 that may be connected with the sequence start output 44 of the test and/or measurement instrument 12.

Optionally, the signal generator circuit 14 may, alternatively or additionally to the start input 52, comprise a start output 54 that may be connected with the sequence start input 38 of the test and/or measurement instrument 12.

In an embodiment, the test and/or measurement system 10 shown in FIG. 1 is configured to calibrate the test and/or measurement instrument 12 as described hereinafter.

A first starting point and a second starting point are determined, wherein the first starting point corresponds to a time at which the reference signal generator circuit 14 begins to generate the reference signal, and wherein the second starting point corresponds to a time at which the capture start circuit 40 begins to generate the capture start signal. The first starting point may be determined according to any one of the embodiments described hereinafter.

According to a first embodiment, the signal prediction circuit 34 may be configured to link the first starting point to a respective value of the clock count, i.e. the clock count corresponding to the first starting point may be determined by the signal prediction circuit 34. According to the first embodiment, the signal prediction circuit 34 receives the clock count from the clock counter circuit 20.

The start circuit 42 is configured to reset the clock signal generated by the clock source 18, the clock count generated by the clock counter circuit 20, and/or the derived clock signal generated by the clock derivation circuit 22. Hereinafter, all these cases are collectively denoted as "reset of the clock signal".

Upon reset of the clock signal, the reference signal generator circuit 14 starts generating the reference signal. Accordingly, the signal prediction circuit 34 can link the first starting point to the clock signal, for example the clock count, as the reset of the clock signal corresponds to the first starting point.

Alternatively or additionally, the signal prediction circuit 34 may receive a signal indicating that the clock signal is reset from the start circuit 42. The signal prediction circuit 34 may link the first starting point to the clock count based on the signal received from the start circuit 42.

According to a second embodiment, the start circuit 42 is configured to control the reference signal generator circuit 14 to start generating the reference signal by forwarding a corresponding signal to the reference signal generator circuit 14 via the sequence start output 44 and the start input 52.

The start circuit 42 receives the clock count from the clock counter circuit 20. As the start circuit 42 controls the reference signal generator circuit 14 to start generating the reference signal, the start circuit 42 can link the first starting point to the clock count directly.

According to a third embodiment, the reference signal generator circuit 14 may determine the first starting point. According to this embodiment, the first starting point is forwarded to the signal prediction circuit 34 via the start output 54 and the sequence start input 38.

The second starting point may be determined according to any one of the embodiments described hereinafter.

According to one embodiment, the signal prediction circuit 34 may receive the clock count from the clock counter circuit 20. The signal prediction circuit 34 may further receive a signal from the capture start circuit 40 indicating that a capture is started, for example the capture start signal. The signal prediction circuit 34 may determine the second starting point based on the received clock count and based on the signal received from the capture start circuit 40.

According to another embodiment, the capture start circuit 40 may receive the clock count from the clock counter circuit 20. The capture start circuit 40 may determine the second starting point directly based on the received clock count and based on the capture start signal generated.

As far as not determined by the signal prediction circuit 34, the first starting point and/or the second starting point are forwarded to the signal prediction circuit 34. Based on the first starting point and the second starting point, the signal prediction circuit 34 generates at least one predicted signal parameter, wherein the at least one predicted signal parameter corresponds to an idealized version of the at least one signal parameter.

The at least one signal parameter and the at least one predicted signal parameter are forwarded to the signal comparison circuit 36. The signal comparison circuit 36 compares the at least one signal parameter of the digitized RF signal with the at least one predicted signal parameter, thereby obtaining at least one error parameter that corresponds to a deviation between the at least one predicted signal parameter and the at least one signal parameter.

In an embodiment, the signal comparison circuit 36 may continuously compare the at least one predicted signal parameter with the at least one signal parameter.

In an embodiment, the at least one error parameter is forwarded to the control circuit 37. The control circuit 37 may set or adapt operational parameters of the test and/or measurement instrument 12 based on the at least one error parameter, thereby calibrating the test and/or measurement instrument 12. For example, the control circuit 37 may adapt the operational parameters of the test and/or measurement instrument 12 such that a magnitude of the at least one error parameter is reduced.

Alternatively or additionally, the control circuit 37 may adapt the operational parameters of the test and/or measurement instrument 12 such that a cost functional that depends on the at least one error parameter is minimized or maximized.

FIG. 2 shows another embodiment of the test and/or measurement system 10, wherein only the differences compared to the embodiment described above regarding FIG. 1 are explained hereinafter. In the embodiment shown in FIG. 2, a device under test 56 is provided between the reference signal output 50 and the measurement input 26. For example, the device under test 56 may be a two-port electronic component or device such as an amplifier, a filter, a mixer, etc.

In general, the device under test 56 receives and processes the reference signal generated by the reference signal generator circuit 14, thereby obtaining the RF signal. In other words, the RF signal received by the measurement input 26 and digitized by the measurement circuit 28 corresponds to an output signal of the device under test 56, namely the reference signal processed by the device under test 56.

In this embodiment, the first starting point and the second starting point are determined as described above. The at least one predicted signal parameter determined by the signal prediction circuit 34 is the at least one signal parameter predicted for the reference signal. The at least one signal parameter determined by the signal analysis circuit 32 is based on the RF signal, i.e. the reference signal processed by the device under test 56.

The signal comparison circuit 36 may compare the at least one signal parameter of the digitized RF signal with the at least one predicted signal parameter, thereby obtaining at least one performance parameter that is indicative of a performance of the device under test 56. In an embodiment, the signal comparison circuit 36 may continuously compare the at least one predicted signal parameter with the at least one signal parameter. Therein, the at least one predicted signal parameter may serve as a reference for determining the at least one performance parameter based on the at least one signal parameter.

Figure 3:
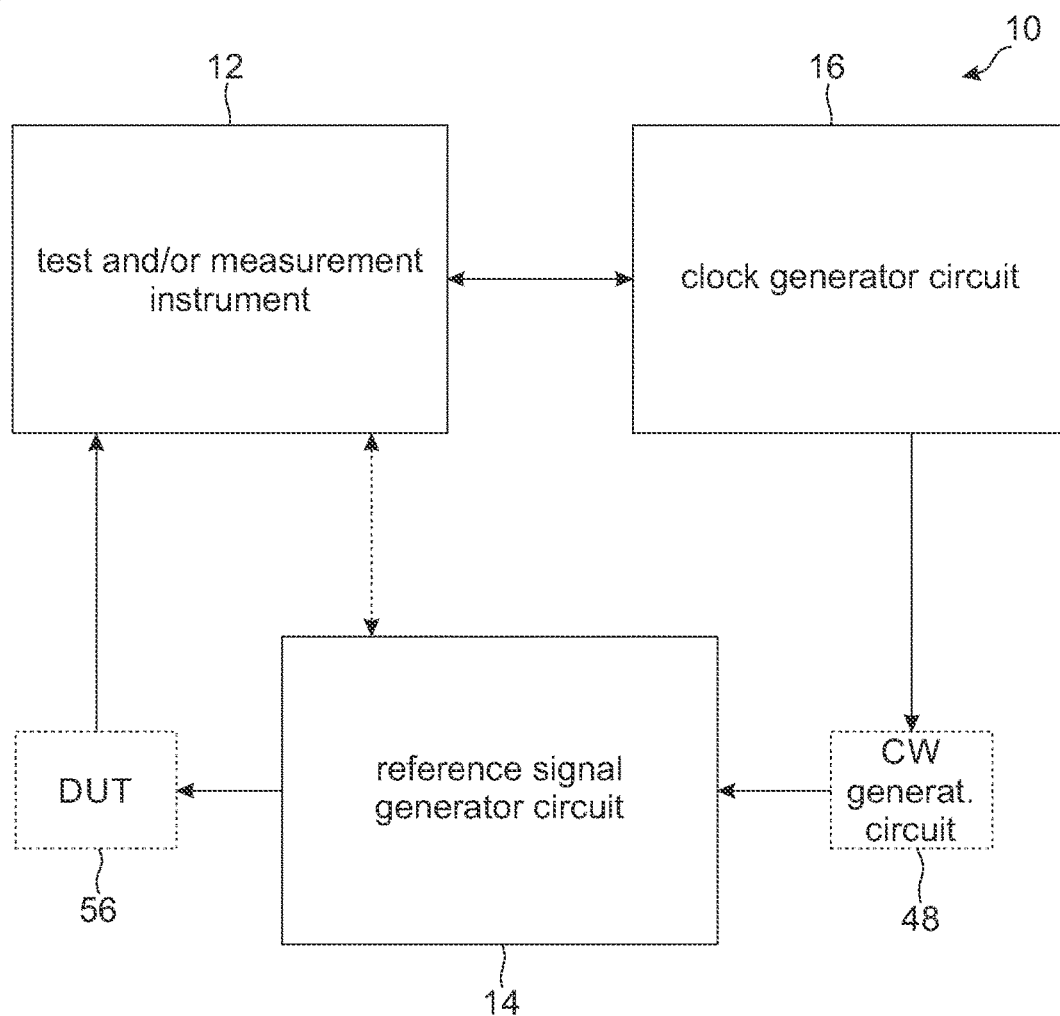
FIG. 3 schematically shows a test and/or measurement system according to another embodiment of the present disclosure.

FIG. 3 schematically shows another embodiment of the test and/or measurement system 10, wherein only the differences compared to the embodiments described above with regard to FIGS. 1 and 2 are explained hereinafter. In the embodiment shown in FIG. 3, the clock signal generator circuit 16 is provided separately from the test and/or measurement instrument 12. In this case, the clock signal generated, the clock count determined, and/or the derived clock signal are/is provided by the external clock generator circuit 16 and forwarded to the test and/or measurement instrument 12, e.g. via a suitable input of the test and/or measurement instrument 12. Thus, compared to the embodiments described above with respect to FIGS. 1 and 2, an external clock is provided with respect to the test and/or measurement instrument 12.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in an embodiment, two or more of these components, or parts thereof, can be integrated or share hardware and/or software, circuitry, etc. In an embodiment, these components, or parts thereof, may be grouped in a single location or distributed over a wide area. In circumstances where the components are distributed, the components are accessible to each other via communication links.

In an embodiments, one or more of the components of the test and/or measure instrument 12, the reference signal generator circuit 14, the clock generator circuit 16, the CW generator circuit 48, the DUT 56, etc., referenced above include circuitry programmed to carry out one or more steps of any of the methods disclosed herein. In an embodiments, one or more computer-readable media associated with or accessible by such circuitry contains computer readable instructions embodied thereon that, when executed by such circuitry, cause the component or circuity to perform one or more steps of any of the methods disclosed herein.

In an embodiment, the computer readable instructions include applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible to a computing device, such as processor circuitry, etc., or other circuity disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In some embodiments, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test and/or measurement system, the test and/or measurement system comprising:
   a clock generator circuit configured to generate a clock signal, the clock generator circuit is connectable to a reference signal generator circuit;
   a capture start circuit configured to generate a capture start signal based on the clock signal;
   a measurement circuit being connectable to the reference signal generator circuit, wherein the measurement circuit is configured to receive the capture start signal from the capture start circuit, wherein the measurement circuit is configured to receive a radio frequency (RF) signal, wherein the RF signal is based on a reference signal generated by the reference signal generator circuit, and wherein the measurement circuit is configured to digitize the RF signal based on the capture start signal, thereby obtaining a digitized RF signal;
   a signal analysis circuit configured to determine at least one signal parameter of the digitized RF signal;
   a signal prediction circuit configured to determine and/or receive a first starting point and a second starting point, wherein the first starting point corresponds to a time at which the reference signal generator circuit begins to generate the reference signal, wherein the second starting point corresponds to a time at which the capture start circuit begins to generate the capture start signal, and wherein the signal prediction circuit is configured to generate at least one predicted signal parameter based on the first starting point and based on the second starting point; and
   a signal comparison circuit configured to compare the at least one signal parameter of the digitized RF signal with the at least one predicted signal parameter.

2. The test and/or measurement system of claim 1, wherein the at least one signal parameter comprises at least one of a phase, a group delay, or an amplitude.

3. The test and/or measurement system of claim 1, wherein the clock generator circuit comprises a clock counter circuit, wherein the clock counter circuit is configured to count clock cycles of the clock signal, thereby obtaining a clock count, and wherein the first starting point and/or the second starting point are/is linked to a respective value of the clock count.

4. The test and/or measurement system of claim 3, wherein the signal prediction circuit is configured to link the first starting point to the respective value of the clock count.

5. The test and/or measurement system of claim 3, wherein the signal prediction circuit or the capture start circuit is configured to link the second starting point to the respective value of the clock count.

6. The test and/or measurement system of claim 3, wherein the signal prediction circuit is configured to continuously receive the clock count.

7. The test and/or measurement system of claim 1, further comprising a start circuit, wherein the start circuit is configured to control the reference signal generator circuit to start generating the reference signal.

8. The test and/or measurement system of claim 7, wherein the start circuit is configured to determine the first starting point based on the clock signal.

9. The test and/or measurement system of claim 1, further comprising a start circuit, wherein the start circuit is configured to control the clock generator circuit to reset the clock signal and/or a derived clock signal that is derived from the clock signal generated.

10. The test and/or measurement system of claim 9, wherein the signal prediction circuit is configured to determine the first starting point based on the clock signal.

11. The test and/or measurement system of claim 1, wherein the reference signal generator circuit is configured to generate the first starting point, and wherein the signal prediction circuit is configured to receive the first starting point from the reference signal generator circuit.

12. The test and/or measurement system of claim 1, further comprising a reference signal generator circuit, wherein the reference signal generator circuit is configured to generate the reference signal based on the clock signal or based on a derived clock signal that is derived from the clock signal generated.

13. The test and/or measurement system of claim 12, wherein the reference signal generator circuit is established as a comb generator.

14. The test and/or measurement system of claim 12, further comprising a continuous wave (CW) generator circuit, wherein the CW generator circuit is interconnected between the clock generator circuit and the reference signal generator circuit.

15. The test and/or measurement system of claim 12, further comprising a device under test, wherein the device under test is interconnected between the reference signal generator circuit and the measurement circuit.

16. The test and/or measurement system of claim 1, further comprising a test and/or measurement instrument, wherein the clock generator circuit, the capture start circuit, the measurement circuit, the signal analysis circuit, the signal prediction circuit, and the signal comparison circuit are integrated into the test and/or measurement instrument.

17. The test and/or measurement system of claim 1, further comprising a test and/or measurement instrument, wherein the capture start circuit, the measurement circuit, the signal analysis circuit, the signal prediction circuit, and the signal comparison circuit are integrated into the test and/or measurement instrument, and wherein the clock generator circuit is established separately from the test and/or measurement instrument.

18. The test and/or measurement system of claim 1, wherein the capture start circuit is configured to continuously generate and output the capture signal.

19. The test and/or measurement system of claim 18, wherein the signal comparison circuit is configured to continuously compare the at least one predicted signal parameter with the at least one signal parameter.

20. The test and/or measurement system of claim 1, further comprising a control circuit, wherein the control circuit is configured to set operational parameters of the test and/or measurement system based on the comparison of the at least one signal parameter with the at least one predicted signal parameter.

* * * * *